March 27, 1962 J. SCHAFFER ETAL 3,027,420

TELEVISION PATTERN GENERATORS

Filed Nov. 2, 1959 2 Sheets-Sheet 1

INVENTORS

JEFFREY SCHAFFER
DENNIS WILLIAM FURBY

BY Larson and Taylor

March 27, 1962 J. SCHAFFER ETAL 3,027,420

TELEVISION PATTERN GENERATORS

Filed Nov. 2, 1959 2 Sheets-Sheet 2

INVENTORS

JEFFREY SCHAFFER
DENNIS WILLIAM FURBY

BY Larson and Taylor

United States Patent Office 3,027,420

Patented Mar. 27, 1962

3,027,420

TELEVISION PATTERN GENERATORS

Jeffrey Schaffer, London, and Dennis William Furby, Enfield, England, assignors to Siemens Edison Swan Limited, London, England, a company of Great Britain Filed Nov. 2, 1959, Ser. No. 850,368
Claims priority, application Great Britain Nov. 3, 1958
3 Claims. (Cl. 178—6)

This invention relates to pattern generators which provide an electronically generated test signal for use in testing television equipment. The test signal is visible in the form of groups of horizontal bars.

Where an interlaced scanning system is used, as is now standard throughout the world, a master oscillator operating at twice line frequency is provided in the pattern generator from which line and frame synchronising pulses are derived. Line synchronising pulses are produced by counting down the master oscillator frequency by two. Frame synchronising pulses are produced by another counting down circuit from the master oscillator depending on the number of lines in the system. In the case of the British 405 line system, which is quoted purely as a numerical example, the master oscillator has a frequency of 20,250 cycles per second. To produce frame synchronising pulses this frequency is counted down by 405 to produce a frequency of 50 cycles per second which is the repetition rate of the frame synchronising pulse. The number of lines per frame is thus 10,125 divided by 50 which equals 202½. A complete picture is made up of two interlaced frames of 202½ lines each giving a picture of effectively 405 lines.

The frame modulation signal to produce the horizontal bars can be obtained by counting down from the line synchronising pulses. This ensures that each line of every bar starts and ends at the edges of the picture and no half lines are produced. However, there is a disadvantage in this arrangement that the horizontal bars generated in successive frames will not occur in the same position in the picture and hence do not reinforce each other. For the bars to reinforce, the ratio of the repetition rate of the frame modulation signal to the frame repetition frequency must be integral. However, in an interlaced scanning system the ratio of line to frame frequency is non-integral. If the test signal is obtained by counting down from the line frequency then it necessarily follows that the ratio of the test signal to the frame frequency is non-integral.

It is an object of the present invention to provide an arrangement to overcome this disadvantage.

Accordingly the present invention provides a pattern generator for a television system of the kind in which successive frames are interlaced to form a picture and having a non-integral number of lines per frame, and comprising a counting down circuit arranged to count down the line synchronising pulses to provide frame modulation pulses, and means for injecting resetting pulses at the frame repetition frequency into the counting down circuit so that there is an integral ratio between the repetition frequency of the frame modulation pulses and the frame repetition frequency.

Preferably the resetting pulses are injected during the frame blanking period.

In one embodiment the resetting pulses are injected into each stage of the counting down circuit from the line synchronising pulses.

In order that the invention may be more fully understood reference will now be made to the drawing accompanying this specification in which.

For the purposes of illustration a twenty-one line raster will be considered in order to make the explanation simpler. However, the invention is equally applicable to any interlaced scanning system.

Figure 1:
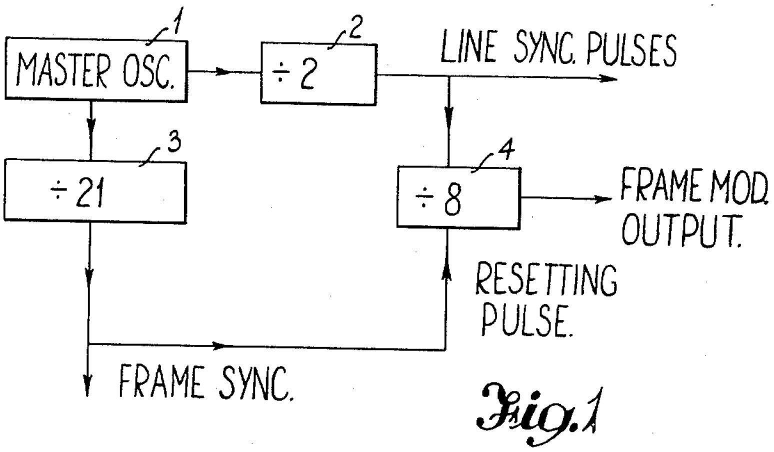
FIG. 1 shows an arrangement in accordance with the invention.

Referring to FIG. 1 a master oscillator 1 generates pulses at a fixed frequency which are applied to a divide-by-two counting down circuit 2 to produce line sync. pulses. The output of the master oscillator is also applied to a further counting down circuit 3 which counts down by an integer equal to the number of lines in the system, in this illustration, 21, to produce frame synchronising pulses. To produce frame modulation pulses which are used as the input signal to generate the horizontal test bars, the line sync. pulses are applied to a further counting down circuit 4. As shown in the figure, a divide-by-eight circuit is used although any other integral value could equally well be chosen to produce a different number of bars in each raster.

Figure 2:
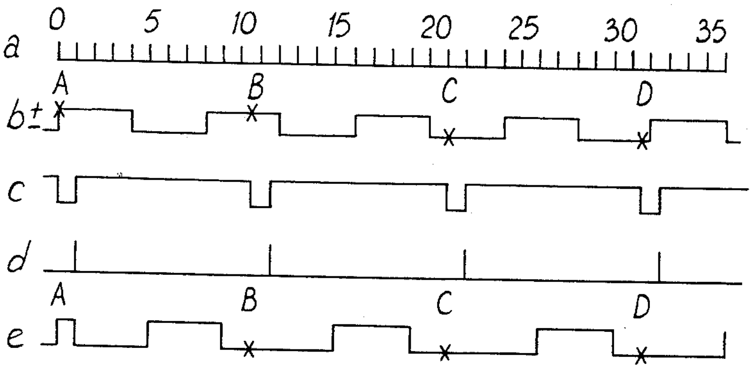
FIG. 2 shows waveforms produced in various parts of FIG. 1.

The operation of the circuit of FIG. 1 will now be considered with reference to FIG. 2 where *a* represents the line sync. pulse output derived from circuit 2. The output of counting down circuit 4 will thus appear as in *b* and the frame sync. pulses produced from counting down circuit 3 will appear as in *c*. It will be seen that at various times A, B, C, and D which occur at the end of successive frames the phase of the frame modulation pulses are different and thus, if the wave form *b* would be applied without modification as frame modulation pulses, a non-stationary picture would be produced and the test bars would appear to continuously move up or down the raster.

To overcome this disadvantage resetting pulses are injected into counting down circuit 4 as shown by a connection from circuit 3 to circuit 4. These resetting pulses are shown at *d* in FIG. 2 and are derived from the frame sync. pulses which occur in each frame blanking period. The rear edge of the frame sync. pulses can conveniently be used for this purpose. Any disturbance in counting down circuit 4 due to the resetting pulses will not be visible as this disturbance occurs during the frame blanking period. The resultant waveform of the frame modulation pulses are shown at *e* and it will be seen now that the phase of this waveform during successive frames A, B, C and D is now constant, apart from an initial transient at A which will only occur in the first frame on switching on.

Figure 3:
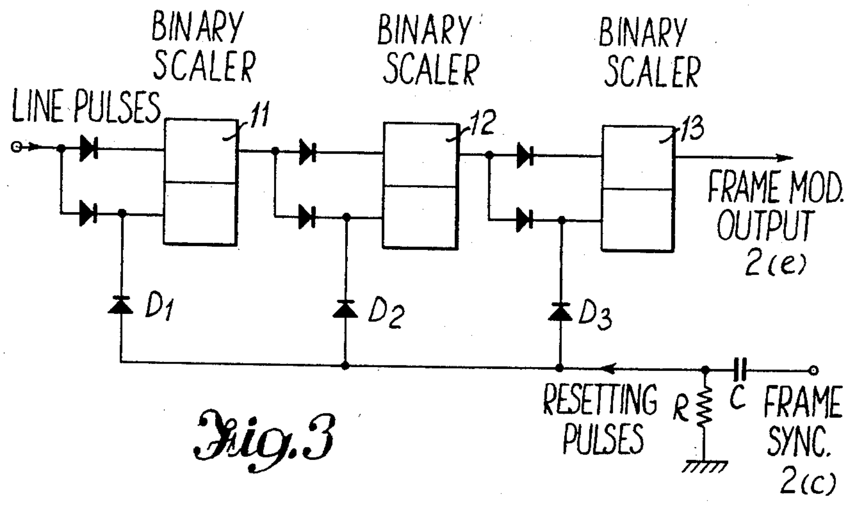
FIG. 3 shows an embodiment of the invention.

A detailed circuit for counting down circuit 4 is shown in FIG. 3 in which the counting-down-by-eight is produced by three cascaded binary scalers 11, 12 and 13 which count down the line sync. pulses applied to the input of scaler 11 in well known manner. The input to each scaler is applied through rectifiers. In addition frame sync. pulses are applied through a differentiating circuit formed by condenser C and resistor R to individual rectifiers D1, D2 and D3 to produce positive pulses corresponding to the trailing edges of the frame sync. pulses. These pulses are applied to one side of each of binary scalers 11, 12, and 13. The effect of this is that the rear edge of each frame sync. pulse will reset each of the binary scalers to a predetermined state irrespective of their condition prior to the arrival of the resetting pulse. Thus the first and each subsequent frame modulation pulse which occurs during each frame period will always occur after a definite number of line sync. pulses. This ensures that the phase of the frame modulation pulses is constant for each frame.

Figure 4:
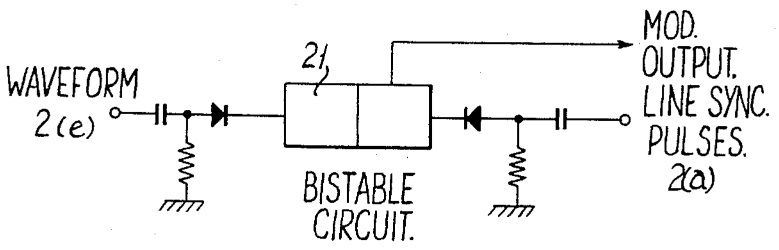
FIG. 4 shows a circuit whereby a test signal of two horizontal lines can be produced.

If narrow bars of modulation are required then the circuit of FIG. 4 can be used in which the waveform 2(*e*) derived from binary scaler 13 is applied as one input to a bistable circuit 21, the other input of which is fed with line sync. pulses. The two inputs can be differentiated and rectified. The output of bistable circuit 21 will thus be at the repetition rate of the frame modulation pulse and will be of one line duration. Since there are two frames to each complete picture the resultant pattern will appear in the form of bars having a width of two lines.

It will be realised that the invention is applicable to any television system in which successive frames are interlaced to form a picture and which has a non-integral number of lines per frame. In each case counting down circuits will be arranged in a manner well known to those versed in the art to provide the necessary counting down rates as determined by the number of lines per frame.

What we claim is:

1. A pattern generator for a television system of the kind in which successive frames are interlaced to form a picture and having a non-integral number of lines per frame, and comprising a counting down circuit having a plurality of states corresponding to the count-down factor and arranged to count the line synchronising pulses to provide frame modulation pulses, and means for injecting resetting pulses at the frame repetition frequency into the counting down circuit to reset the counting down circuit to a predetermined state so that there is an integral ratio between the repetition frequency of the frame modulation pulses and the frame repetition frequency.

2. A pattern generator for a television system of the kind in which successive frames are interlaced to form a picture and having a non-integral number of lines per frame and comprising a counting down circuit having a plurality of stable states equal in number to the count-down factor and arranged to count down the line synchronising pulses to provide frame modulation pulses and means for injecting resetting pulses at the frame repetition frequency into the counting down circuit during the frame blanking period to reset the counting down circuit to a predetermined stable state so that there is an integral ratio between the repetition frequency of the frame modulation pulses and the frame repetition frequency.

3. A pattern generator for a television system of the kind in which successive frames are interlaced to form a picture and having a non-integral number of lines per frame, and comprising a counting down circuit consisting of a plurality of bistable counting down stages connected in cascade and arranged to count down the line synchronising pulses to provide frame modulation pulses, and means for injecting resetting pulses at the frame repetition frequency into each stage of the counting down circuit during the frame blanking period to reset each stage to a predetermined stable state so that there is an integral ratio between the repetition frequency of the frame modulation pulses and the frame repetition frequency.

References Cited in the file of this patent

UNITED STATES PATENTS

| | | |
|---|---|---|
| 2,591,816 | Holland | Apr. 8, 1952 |

FOREIGN PATENTS

| | | |
|---|---|---|
| 233,313 | Switzerland | Oct. 16, 1944 |